Nov. 10, 1959
W. BENZ ET AL
2,911,960
REMOTE CONTROL APPARATUS FOR REVERSIBLE
INTERNAL COMBUSTION ENGINES
Filed Feb. 15, 1957
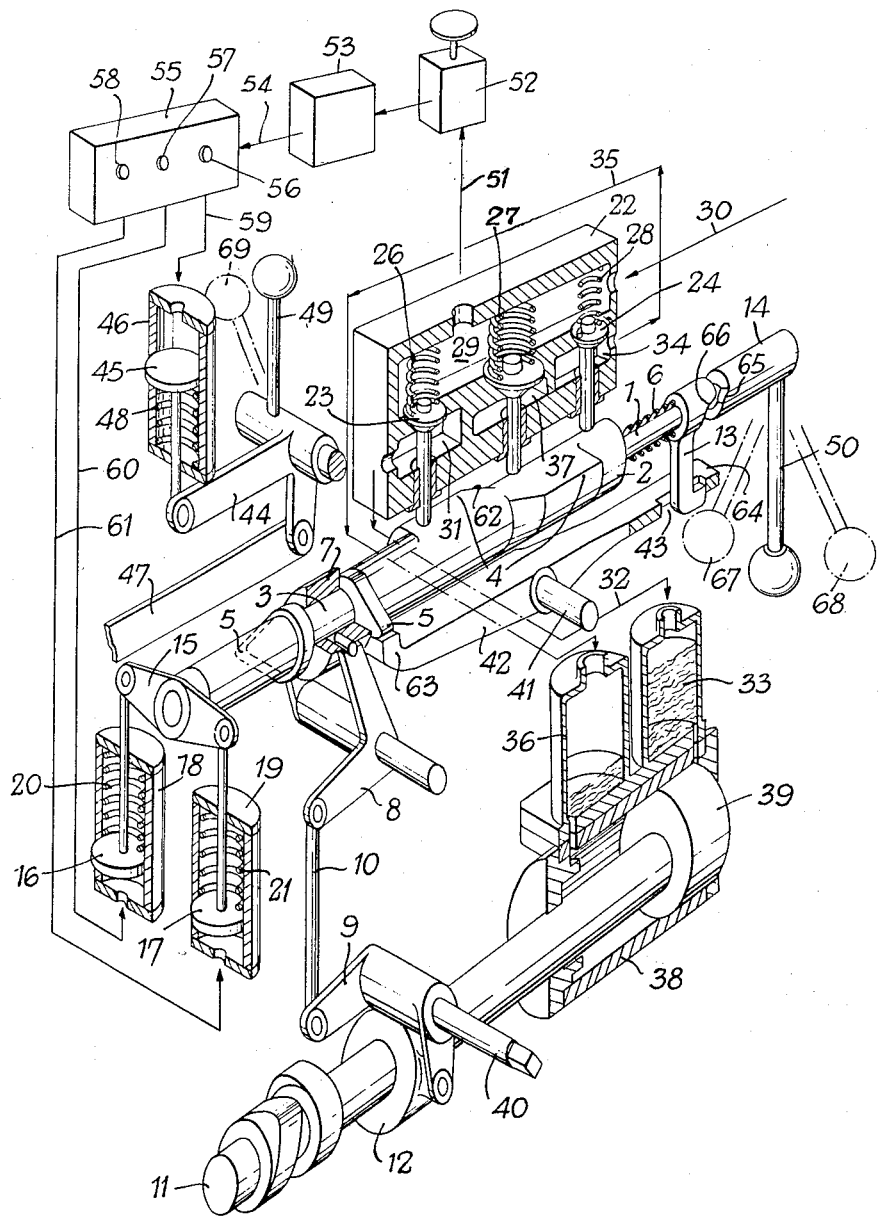

United States Patent Office 2,911,960
Patented Nov. 10, 1959

2,911,960

REMOTE CONTROL APPARATUS FOR REVERSIBLE INTERNAL COMBUSTION ENGINES

Walter Benz, Mannheim-Friedrichfeld, and Friedrich Henninger, Mannheim-Wallstadt, Germany, assignors to Motoren-Werke Mannheim A.G. vorm. Benz Abt. Stat. Motorenbau, Mannheim, Germany, a German company Application February 15, 1957, Serial No. 640,486

Claims priority, application Germany February 17, 1956

12 Claims. (Cl. 123—41)

The invention relates to remote control apparatus for reversible internal combustion engines, more especially diesel engines, for the propulsion of ships, in which compressed air is used as controlling medium. The use of compressed air simplifies the construction of the control pipes to the bridge, which pipes must in many cases be movable, and makes the installation largely insensitive to weather influences.

The known remote control installations require a large number of actuating valves and actuating cylinders for the reversal into two directions, for starting purposes, adjusting the fuel supply and removing obstructions. One particular reason why such an installation requires many parts is the condition that for safety reasons it must be possible for the engine to be controlled from the bridge and also from the engine room. For this reason, it is necessary to have a large number of double non-return valves and a second set of actuating valves. A further difficulty is to be seen in the fact that starting the diesel engine and displacement of the control shaft for reversing purposes is effected by means of high-pressure compressed air, whereas the remote control on the other hand must be fed with low pressure compressed air for safety reasons. Consequently, relay valves are required for coupling the two compressed air supply systems. Moreover, it is required that it should be possible for the engine control movements to be carried out from the engine room by mechanical means with a failure of the low pressure compressed air section, since this method of actuation proved over many years is considered to be the safest. The prior known constructional forms do not permit this possibility.

The object of the invention is to provide a remote control installation which meets the standards mentioned above and which is characterised by greatest possible simplicity.

This object is achieved according to the invention with a remote control installation of the type described above by the fact that the compressed air coming from the actuating valves effects the turning or displacement of a cam shaft which opens the reversing valve corresponding to the required direction of rotation, the subsequent movement of the control shaft further changing the position of the cam shaft so that it moves from the region of the reversing valve into the region of the starting valve and opens the latter.

By means of this arrangement, it is possible to operate the remote control of the reversing system with only two actuating valves and one double-acting or two single-acting actuating cylinders. Another feature to be mentioned as an advantage is the fact that it is possible according to a further development of the invention for the manual operation to be carried out purely mechanically without any change-over operations in the event of an interruption in the connection to the bridge or the supply of low-pressure compressed air, it only being necessary as before to have the starting air, without which engines of this size cannot be started. Apart from the hand lever, no expenditure for mechanical equipment is necessary for manual operation. Finally, the arrangement according to the invention ensures that leakages in the control pipes to the bridge cannot have a disturbing effect, since these pipes are only charged when changing an operating condition. Another particularly advantageous feature of the invention consists in that the operation of stopping the engine is effected by a brief actuation of the stop valve, this being effected by suitably blocking a two-armed lever, which in addition carries out in an extremely simple manner the automatic switching off or limitation of the fuel supply during the reversing and starting operations. The last-mentioned steps have a favourable effect in the sense of a smallest possible stressing of the control pipes and of simplification in other respects.

The apparatus is shown diagrammatically in the accompanying drawing. The shaft 1 of the remote control apparatus has the cam shaft 2 and the extension shaft 3 arranged thereon so that they can be displaced axially of the shaft 1 but cannot rotate relatively thereto. The cam shaft 2 carries two cam surfaces 4 and the extension shaft 3 carries two cam surfaces 5. The cam shaft 2 and the extension shaft 3 are urged towards one another by a spring 6, so that when one of the parts is displaced, the other part must follow. Engaging in the extension shaft 3 is the driver ring 7, which is connected by the bell-crank levers 8 and 9 and the connecting rod 10 to the sleeve 12 arranged on the control shaft 11 so as to be fast longitudinally but movable in the direction of rotation, so that longitudinal movements of the control shaft are transmitted to said ring. The shaft 1 also has loosely fitted thereon the pawl 13, which is so guided in such a manner (not illustrated) that it can be displaced on the shaft 1 but cannot turn from the position shown. The spring 6 tends to displace the pawl 13 in a direction towards the holding cam 14 arranged fast on the shaft 1. The movements of the pistons 16 and 17, which slide in the actuating cylinders 18 and 19 and are returned by the biassed springs 20 and 21 into the position illustrated, are transmitted to the shaft 1 through the double lever 15. Secured in the vicinity of the cam shaft 2 is the valve housing 22, containing the reversing valves 23 and 24 and the starting valve 25. The said valves are urged on to their seating in the housing 22 by the springs 26, 27 and 28, and also by the compressed air in the chamber 29. Compressed air at a high pressure (12–35 kg./cm.²) is supplied at 30 to the chamber 29 from a starting air compressor (not shown). Disposed below the valve 23 is the chamber 31, which is in communication by way of a pipe 32 with the oil cylinder 33. Situated beneath the valve 24 is the chamber 34 communicating through the pipe 35 with the oil cylinder 36. The chamber 37 below the valve 25 is connected to the engine starter device (not shown). The oil cylinders 33 and 36 are in communication with the control shaft displacement cylinder 38, in which a piston 39 connected fast to the sleeve 12 is adapted to slide. Arranged on the bell-crank lever 9 is a square shaft 40 by which it is possible to displace the control shaft manually. Fixed to the stopping shaft 41 is the two-armed lever 42 formed with a recess 43, and also the bell-crank lever 44 providing the connection between the piston 45 of the actuating cylinder 46 and the control rod 47 of the injection pumps (not shown). A spring 48 ensures that the lever 42 bears on one of the cam surfaces 5 of the extension shaft 3 or on the external surface of the driver ring 7. Fixed to the bell-crank lever 44 is the lever 49 which, like the lever 50 fixed on the holding cam 14, is so arranged that it is accessible to the personnel in the engine room. A pipe 51 leads from the chamber 29 to the shut-off valve 52, which controls the supply of air to the pressure-reducing valve 53. The pressure-reducing valve 53 is so adjusted that the pressure of 35 kg./cm.² obtaining in the chamber 29 is reduced to 8 kg./cm.² and is fed through the pipe 54 to the actuating valve housing 55. This housing contains the stop valve 56, the actuating valve 57 for reversing and starting in the direction of rotation for "ahead" and the actuating valve 58 for reversing and starting in the direction of rotation for "astern." The valve 56 is connected by the pipe 59 to the internal space of the actuating cylinder 46. The valves 57 and 58 are in communication through the pipes 60 and 61 with the internal spaces of the actuating cylinders 18 and 19. The actuating valve housing 55 is arranged on the bridge. The valves 52 and 53 can be arranged both on the bridge and in the engine room. All the other parts illustrated are fitted on the engine. It is merely the pipes 59, 60, 61 and the pipe 51 or 54, if a control position which can be switched on and off is provided, which lead as flexible pipes from the engine room to the bridge of the ship.

The operation of the remote control installation according to the invention is as follows:

Let it be assumed that the control shaft is in the position illustrated, i.e. in the position for rotating in the direction for "astern." In this position it is important to ensure that the control shaft is locked against axial movement when the engine is running. This is achieved in view of the fact that the control shaft 11 is coupled to the driver ring 7 through the parts 12, 9, 10 and 8 and the driver ring 7 itself bears against the end 63 of the two-armed lever 42. Thus the end 63 effectively prevents the driver ring 7 from axial displacement and in consequence the shaft 11 is similarly prevented from being axially displaced.

Assume now that the engine is to be reversed for "ahead." The ship's officer depresses the actuating valve 57, whereby compressed air from the pipe 60 acts on the piston 16 and turns the main shaft 1 through 45° in the clockwise direction. The left cam surfaces 4 of the cam shaft 2 lifts the valve 23 against the force of the spring 26 and the right hand cam surface of the extension shaft 3 turns the two-armed lever in a counter-clockwise direction and therefore depresses the end 63 which no longer bears against the driver ring 7. Compressed air then passes from the chamber 29 into the chamber 31 and from thence through the pipe 32 into the oil cylinder 33. The oil contained in the latter is displaced into the chamber to the right of the piston 39, whereby the latter can shift the control shaft 11 towards the left into the position for the direction of rotation corresponding to "ahead." The movement of the control shaft is transmitted through the parts 12 and 10 to the bell crank lever 8 which is caused to rotate in a clockwise direction therefore constraining the driver ring 7 and in consequence the cam shaft 2 to move axially towards the right. It will be appreciated that with the downward depression of the end 63 of the two-armed lever 42 this end 63 no longer prevents the driver ring 7 from moving towards the right whilst in any such axial movement the bell crank lever 8 passes in front of the end 63 of the two-armed lever 42 and that in consequence the two-armed lever 42 can no longer prevent such movement of the bell crank lever 8. As a result, the inclined surface 62 lifts the starting valve 25. Compressed air flows into the chamber 37 and from thence to the starting system of the engine, whereby the latter is started. Due to the movement of the cam shaft 2 as described above, the left-hand cam surfaces 4 is moved away from the reversing valve 23 and the latter closes again. The counter-clockwise turning of the two-armed lever 42 sets the control rod 47 at the position for zero delivery. In the course of the movement of the cam shaft 2 towards the right, the left hand end 63 of the lever 42, after leaving the right protuberance 5, comes into contact with the driving ring 7, whereby the zero delivery position is maintained, and then with the base circle of the left hand cam surfaces 5, whereby the control rod 47 of the fuel pumps is subjected to the influence of the speed governor (not shown), which sets it at the position for supplying fuel. The pawl 13 cannot snap under the right end 64 of the lever 42, since its raised portion 66 has come into contact with the raised portion 65 of the holding cam, whereby the pawl 13 is secured in the position shown. When the engine has started, the ship's officer releases the actuating valve 57 and thereby vents the actuating cylinder 18 through the pipe 60, whereupon the spring 20 returns the main shaft into the position illustrated. As a result, the starting valve 25 can close again. The reversing and starting operation is completed. If for example one of the pipes 60, 51 or 54 should develop a leak to such an extent that the actuating cylinder 18 no longer contains sufficient pressure for moving the shaft 1, the operation which has been described above can also be carried out by moving the lever 50 into the position 67.

If the engine is to be started from the position illustrated in the direction of rotation corresponding to "astern," the actuating valve 58 is to be depressed. By this means, it is the piston 17 which is acted upon, which piston against the action of the spring 21, turns the shaft 1 in a counter clockwise direction. The reversing valves 23 and 24 are not affected by this movement. It is only the starting valve 25 which is open, whereby the engine is started. The position of the lever 42 is not influenced, so that the speed governor of the engine can allow the full amount of fuel to be supplied. In the event of failure of the remote control system, this operation can be initiated by shifting the lever 50 into the position 68. The operations just described can of course also be made effective for the opposite direction of rotation.

If the engine is to be stopped, the stop valve 56 is depressed. By this means, it is the piston 45 of the actuating cylinder 46 which is acted upon, whereby the control rod 47 is moved by the bell-crank lever 44 to the position for "zero" delivery. The lever 42 is turned in a counterclockwise direction, so that the pawl 13 can engage beneath the end 64 under the action of the spring 6. The result hereby achieved is that a brief depression of the stop valve 56 is sufficient to stop the engine, so that it is not necessary for the ship's officer to hold the stop valve depressed until the engine has stopped, which always takes some time with large engines and when the ship is moving at high speed. In the event of failure in the remote control system, this operation can be produced by moving the lever 49 to the position 69. Actuation of the valves 57 or 58 again releases the stopping action on the parts 64 and 13.

The reversing process can be stopped and cancelled out before it is completed by the actuating valve for the opposite direction being depressed or by the lever 50 being moved to its other position. In order to avoid unnecessary losses of air with failure of the control pipes to the bridge owing to the pipe breaking, the valve 52 can be closed. In this case, the engine is operated from the engine room by means of the levers 50 and 49.

The driving rings 7 can be so designed that the engine is already receiving a reduced supply of fuel when the starting valve 25 is first opened. Under certain circumstances, it can also be advantageous to operate with a cam shaft 2 which carries out two rectilinear movements instead of the rotational and longitudinal movements which have been illustrated. The movements can take place in one plane or in several planes.

We claim:

1. A remote control installation for selectively reversing the direction of operation of an internal combustion engine and for starting said engine, comprising in combination a displaceable cam shaft, a plurality of cam surfaces formed on said cam shaft, selectively actuatable means coupled to said cam shaft for displacing said cam shaft by first and second displacements according to the desired direction of operation of the engine, a control shaft arranged to be coupled to said engine and which is displaceable for determining the direction of operation of said engine, a first valve means actuatable by one of said cam surfaces upon said first displacement to effect a displacement of said control shaft so as to determine a first direction of operation of said engine, a second valve means actuatable by another of said cam surfaces upon said second displacement of said cam shaft to effect a displacement of said control shaft so as to determine a second and opposite direction of operation of said engine, coupling means for coupling said control shaft to said cam shaft for effecting a further displacement of said cam shaft upon a displacement of said control shaft and a third valve means actuatable by a cam surface of said cam shaft upon said further displacement of said cam shaft to start said engine.

2. A remote control installation for selectively reversing the direction of operation of an internal combustion engine and for starting said engine, comprising in combination a displaceable cam shaft, a plurality of cam surfaces formed on said cam shaft, selectively actuatable means coupled to said cam shaft for rotationally displacing said cam shaft in said first and second opposite senses according to the desired direction of operation of the engine, displaceable means actuatable by a cam surface of said cam shaft upon rotational displacement of said cam shaft for stopping the flow of fuel to said engine, a control shaft arranged to be coupled to said engine and which is displaceable so as to determine the direction of operation of said engine, a first valve means actuatable by one of said cam surfaces upon rotational displacement of said cam shaft in a first sense to effect a displacement of said control shaft so as to determine a first direction of operation of said engine, a second valve means actuatable by another of said cam surfaces upon rotational displacement of said cam shaft in said second and opposite sense to effect a displacement of said control shaft so as to determine a second and opposite direction of operation of said engine, coupling means for coupling said control shaft to said cam shaft for effecting a translational displacement of said cam shaft upon a displacement of said control shaft for de-actuating said displaceable means for permitting flow of fuel to said engine, and third valve means actuatable by a cam surface of said cam shaft upon said translational displacement of said cam shaft so as to start said engine.

3. A remote control installation for selectively reversing the direction of operation of an internal combustion engine and for starting said engine, comprising in combination a displaceable cam shaft, a plurality of cam surfaces formed on said cam shaft, selectively actuatable means coupled to said cam shaft for rotationally displacing said cam shaft in first and second opposite senses according to the desired direction of operation of the engine, displaceable means actuatable by a cam surface of said cam shaft upon the rotational displacement of said cam shaft for stopping the flow of fuel to said engine, a control shaft arranged to be coupled to said engine and which is displaceable for determining the direction of operation of said engine, first, second and third valve means respectively arranged for coupling to a source of compressed fluid, said first valve means being actuatable by one of said cam surfaces upon rotational displacement of said cam shaft in a first sense so as to permit a displacement of said control shaft under the influence of said compressed fluid so as to determine a first direction of operation of said engine, said second valve means being actuatable by another of said cam surfaces upon rotational displacement of said cam shaft in said second and opposite sense to permit a displacement of said control shaft under the influence of said compressed fluid so as to determine a second and opposite direction of operation of said engine, and coupling means for coupling said control shaft to said cam shaft for effecting a translational displacement of said cam shaft upon displacement of said control shaft for de-actuating said displaceable means so as to permit the flow of fuel to said engine, said third valve means being actuatable by a cam surface of said cam shaft upon said translational displacement of said cam shaft to permit the starting of said engine under the influence of said compressed fluid.

4. A remote control installation according to claim 3, and furthermore comprising a remote control operating unit arranged for connection to a source of compressed fluid and coupled to said selectively actuatable means and means for slectively directing said compressed fluid to said selectively actuatable means for the selective actuation thereof.

5. A remote control installation according to claim 4, wherein said selectively actuatable means comprises a pair of cylinders, a pair of pistons respectively disposed in said cylinders, a pair of piston rods, a bridging member pivotally connected at its end to said piston rods and rigidly coupled at an intermediate position thereof to an end of said cam shaft, an end face of each of said cylinders defining therein an opening, said openings communicating via a respective pair of coupling pipes with said operating unit, and spring biassing means for respectively biassing said pistons against said openings.

6. A remote control installation for selectively reversing the direction of operation of an internal combustion engine and for starting and stopping said engine, comprising in combination a displaceable cam shaft, a plurality of cam surfaces formed on said cam shaft, selectively actuatable means coupled to said cam shaft for rotationally displacing said cam shaft in first and second opposite senses according to the desired direction of operation of the engine, displaceable means, independently actuatable means coupled to said displaceable means for displacing said engine displaceable so as to stop the flow of fuel to said engine, a remote control operating unit arranged for connection to a source of compressed fluid and respectively coupled to said selectively actuatable means and said independently actuatable means and means for selectively directing said compressed fluid to said selectively actuatable means and said independently actuatable means for the selective actuation thereof, said displaceable means being furthermore actuatable to stop the flow of fuel to said engine by a cam surface of said cam shaft upon the rotational displacement of said cam shaft, a control shaft arranged to be coupled to said engine and which is displaceable for determining the direction of operation of said engine, first, second and third valve means respectively arranged for coupling to a source of compressed fluid, said first valve means being actuatable by one of said cam surfaces upon rotational displacement of said cam shaft in a first sense so as to permit a displacement of said control shaft under the influence of said compressed fluid so as to determine a first direction of operation of said engine, said second valve means being actuatable by another of said cam surfaces upon rotational displacement of said cam shaft in said second and opposite sense to permit a displacement of said control shaft under the influence of said compressed fluid so as to determine a second and opposite direction of operation of said engine, and coupling means for coupling said control shaft to said cam shaft for effecting a translational displacement of said cam shaft upon displacement of said control shaft for de-actuating said displaceable means so as to permit the flow of fuel to said engine, said third valve means being actuatable by a cam surface of said cam shaft upon said translational displacement of said cam shaft to permit the starting of said engine under the influence of said compressed fluid.

7. A remote control installation according to claim 6, wherein said selectively actuatable means comprises a pair of cylinders, a pair of pistons respectively disposed in said cylinders, a pair of piston rods, a bridging member pivotally connected at its ends to said piston rods and rigidly coupled at an intermediate position thereof to and end of said cam shaft, an end face of each of said cylinders defining therein an opening, said openings communicating via a respective pair of coupling pipes with said operating unit, and spring biassing means for respectively biassing said pistons against said openings, and wherein said independently actuatable means comprises a cylinder, a piston disposed in said cylinder, a piston rod coupled to said displaceable means, an end face of said cylinder defining therein an opening, said opening communicating via a coupling pipe with said operating unit and spring biassing means for biassing said piston against said opening.

8. A remote control installation according to claim 7, wherein said displaceable means comprises a two-arm lever, a mounting for said lever, said mounting being coupled to the piston rod of said independently actuatable means and being rotatable for stopping the supply of fuel to said engine, a first arm of said lever being actuatable by a cam surface of said cam shaft for rotating said mounting, and a locking pawl for engaging a second arm of said lever in a locked position upon rotation of said axial mounting and upon non-actuation of said first, second and third valve means and upon the stopping of the supply of fuel to said engine.

9. A remote control installation according to claim 6, and furthermore comprising a first manually operable lever coupled to said cam shaft for manually effecting said rotational displacement of said cam shaft.

10. A remote control installation according to claim 8, and furthermore comprising a second manually operable lever coupled to said axial mounting for manually effecting said rotation of said axial mounting.

11. A remote control installation according to claim 8, and furthermore comprising spring biassing means for biassing said pawl into engagement with said second arm, and a further cam surface located on said cam shaft for disengaging said pawl from the position in which said second arm is locked upon rotational displacement of said cam shaft.

12. A remote control installation according to claim 8, wherein that cam surface arranged to engage the first arm of said two arm lever to effect rotation of said mounting is provided with a portion for engagement with said first arm so as to effect upon said engagement sufficient rotation of said axial mounting for reducing the supply of fuel to said engine.

References Cited in the file of this patent
UNITED STATES PATENTS

| | | |
|---|---|---|
| 2,080,882 | Walti | May 18, 1937 |
| 2,243,883 | Ramstad | June 3, 1941 |
| 2,304,472 | Olsson | Dec. 8, 1942 |
| 2,395,202 | Stevens et al. | Feb. 19, 1946 |
| 2,550,931 | Linhart | May 1, 1951 |